Dec. 2, 1924.
A. B. SEVERN
ROLLER SIDE BEARING
Filed Oct. 7, 1921
1,517,468
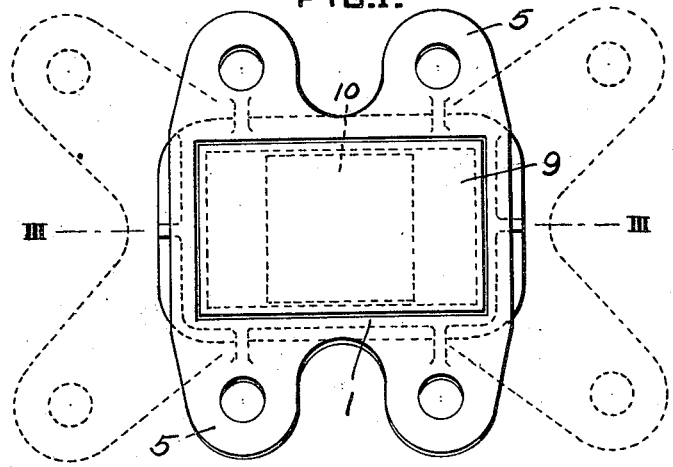
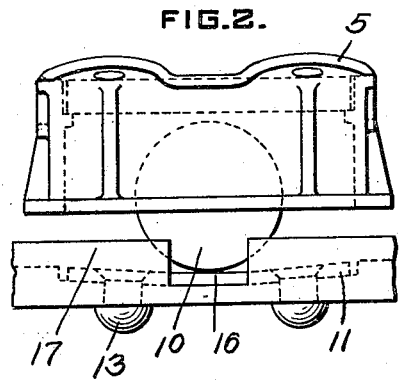
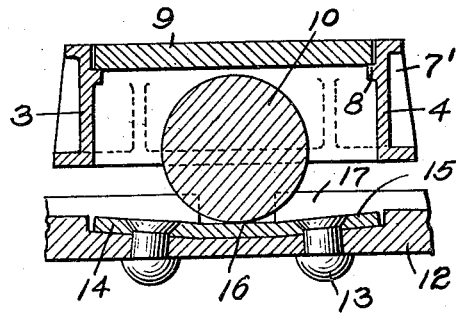
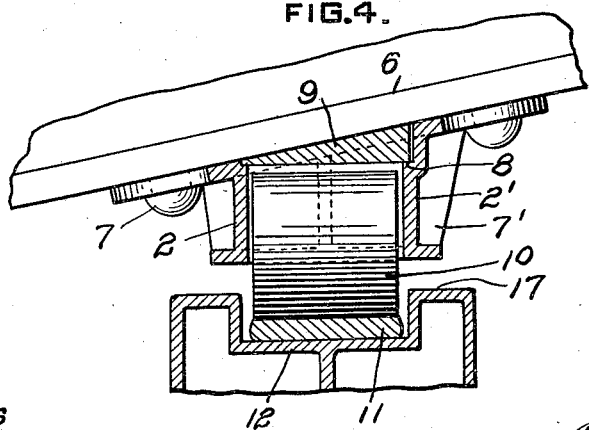
INVENTOR
Arthur B. Severn
By Winter & Brown
his attys
WITNESSES Patented Dec. 2, 1924.

1,517,468

UNITED STATES PATENT OFFICE.

ARTHUR B. SEVERN, OF PITTSBURGH, PENNSYLVANIA, ASSIGNOR TO A. STUCKI COMPANY, OF PITTSBURGH, PENNSYLVANIA, A CORPORATION OF PENNSYLVANIA.

ROLLER SIDE BEARING.

Application filed October 7, 1921. Serial No. 506,020.

*To all whom it may concern:*

Be it known that I, ARTHUR B. SEVERN, a citizen of the United States, and a resident of Pittsburgh, in the county of Allegheny and State of Pennsylvania, have invented a new and useful Improvement in Roller Side Bearings, of which the following is a specification.

This invention relates to anti-friction side bearings for railway cars and has for its objects the provision of a bearing of this type in which the roller is self-centering, in which the liability of the roller developing flat spots or recesses on its circumference, or the track upon which the roller runs becoming rough or recessed, thus interfering with the free travel of the rolling element, is prevented, and in which the roller gravitates to the center of its track under its own weight immediately after contact between the cage and the roller is broken, that is, as soon as the body of the car lifts sufficiently to break contact with the roller.

Another object of the invention is to provide a removable wear plate forming the bottom of the cage and which is held in place by the positioning of the cage itself.

A special object is to provide a side bearing which obviates the necessity of using any special devices for moving the roller, either into operative or inoperative positions.

A still further object is to provide a device of the kind described in which the parts cooperate to retain the roller positively in place regardless of the degree of vertical clearance between the cage and roller even if affected by the varying positions of the parts during operation.

These and other objects of the invention will more readily appear from the following description taken in connection with the appended claims.

Similar reference characters are used to denote corresponding parts throughout the several views of the drawings in which Fig. 1 is a plan view of one embodiment of the invention; Fig. 2 an elevational view of the device illustrated in Fig. 1; Fig. 3 a longitudinal sectional view with parts in elevation taken on the line III—III of Fig. 1; and Fig. 4 a transverse sectional view thereof.

The embodiment of the invention shown comprises a cage 1 having the depending side walls 2, 2' and the end walls 3 and 4, and is provided with perforated ears or lugs 5 for attaching the same to the body bolster 6 as by bolting indicated at 7, and the strengthening ribs 7'.

The ears or lugs 5 may be disposed at the sides of the cage as shown in full lines in Fig. 1, or at any other point so as to accommodate the bearing to various cars as is found most convenient or desirable, and as indicated in dotted lines therein.

A shoulder or ledge 8 is formed on the side and end walls which is adapted to support and retain the upper bearing plate 9 in close contact with the bolster 6.

The dimensions of both the cage and bearing plate gradually increase from one side to the other, as clearly shown in Fig. 4, so as to accommodate themselves to the inclination of the body bolster and at the same time present a substantially horizontal bearing surface to the cylindrical roller 10 which rides upon a lower bearing plate or track 11 mounted on the truck bolster 12 and attached thereto as by riveting as indicated at 13.

The lower bearing plate 11 slopes downwardly from both ends 14 and 15 to a central flat portion 16, and flanking each side of the plate are the upstanding ribs 17 which terminate near the central flat portion leaving open spaces adjacent thereto, as clearly shown in Figs. 2 and 3.

The length of the roller 10 is slightly less than the distance between the side walls 2 and 2' and the space between the opposing ribs 17 so that the same is absolutely free, being supported by merely resting upon the track 11 and is perfectly free to gravitate under its own weight towards the flat central portion 16 whenever the upper bearing plate 9 is out of contact therewith.

The walls 2 and 2' and the ribs 17 face each other and each partially embraces the roller 10 so as to prevent its lateral displacement, while the end walls 3 and 4 limit its rolling movement along the bearing plates 9 and 11. The ribs 17 and the depending walls 2 and 2' of the cage are in alignment and face each other so that the upper surface of the ribs and the lower surface of said walls abut and cooperate to function as a plain bearing in case of breakage of the roller 10. In the embodiment illustrated the ribs 17 are shown as formed integrally with the bolster with the bearing plate mounted in the depression between them. It is to be understood, however, that such portions need not be made as a part of the bolster itself but may be in the form of a separate and independent member which is attached to the bolster.

Each of the bearing plates is formed independently so that the same may be made of material possessing high wear-resisting qualities without adding greatly to the cost of manufacture, and each is removably mounted to facilitate replacement if desirable or necessary.

The open spaces provided between the ends of the ribs 17 adjacent the central flat portion 16 permit dirt, snow, ice, and similar foreign materials to be readily discharged and prevents accumulation thereof upon the wearing surfaces of the bearing plate 11.

The operation of the device is as follows: The roller 10 normally rests upon the flat portion 16. Whenever the car body sways sufficiently the upper bearing plate 9 is brought into contact with the roller and any swiveling movement of the truck will cause the roller to ride up on the inclined end portions 14 or 15 of the lower bearing plate. As soon as the body lifts, contact between the bearing plate 9 and the roller is broken permitting the roller to gravitate under its own weight back to the flat central portion 16. The return of the roller occurs immediately upon the lifting of the body and without the use of any auxiliary mechanism or parts. This quick return due to the lack of all lost motion devices is found to be of great importance in practical use, and with applicant's device is secured by a very simple construction.

Due to the fact that the flat central portion is of appreciable length, the roller 10 will not always come to rest at the same point but at various points throughout its length and will rest upon various parts of its own periphery thus assuring substantially uniform wear of both the bearing plate and the roller. Besides, the roller itself when thrown against the end walls by severe end shocks will rotate somewhat to present new lines of contact.

The length of the depending walls of the cage 1 are of such dimensions that the roller 10 will at all times be embraced thereby and properly maintained in position upon the bearing surfaces. In case the roller 10 should become broken from any cause the lower flat surfaces of the depending walls 2 and 2′ will abut the upper flat surface of ribs 17, the two cooperating to function as a plain bearing under such circumstances.

The bearing described is of simple construction, is inexpensive to manufacture, easy to repair, is very durable, is quickly responsive and self-centering, contains a minimum number of parts and is so constructed as to prevent accumulation of dirt or foreign substances upon the bearing surfaces.

I claim:

A side bearing for railway cars comprising a cage adapted to be supported from the body bolster and having walls depending therefrom, an upper bearing plate, the depending walls of the cage extending below the said upper bearing plate and provided at their bottom edges with lateral flanges forming flat emergency bearing surfaces, the interior surfaces of the depending walls being substantially smooth and unobstructed throughout their entire extent, a lower bearing plate, a support therefor having upstanding side ribs flanking the same, the top edges of said ribs forming flat emergency bearing surfaces adapted to cooperate with the flat emergency bearing surfaces on the depending walls, a free roller having plain flat ends interposed between the said plates confined in position thereon by both the depending walls of the cage and said upstanding ribs, said lower bearing plate being inclined downwardly from both ends towards a flat central portion whereby the roller moves theretowards immediately contact between the plate and upper roller is destroyed.

In testimony whereof, I sign my name.

ARTHUR B. SEVERN.

Witness:
EDWIN O. JOHNS.